United States Patent
Winslow et al.

(10) Patent No.: US 8,385,515 B2
(45) Date of Patent: Feb. 26, 2013

(54) INTUITIVE PROFILING ENGINE FOR VOICE-BASED TELEPHONY APPLICATIONS

(75) Inventors: Doug Winslow, Tampa, FL (US); Paul Hult, Tampa, FL (US)

(73) Assignee: Ignite Media Solutions, McLean, VA (US)

( * ) Notice: Subject to any disclaimer, the term of this patent is extended or adjusted under 35 U.S.C. 154(b) by 1672 days.

(21) Appl. No.: 11/605,335

(22) Filed: Nov. 29, 2006

(65) Prior Publication Data

US 2008/0075238 A1 Mar. 27, 2008

Related U.S. Application Data

(60) Provisional application No. 60/841,541, filed on Sep. 1, 2006.

(51) Int. Cl.
*H04M 1/64* (2006.01)

(52) U.S. Cl. ............... 379/88.01; 379/67.1; 379/88.08; 379/88.16; 379/88.19; 379/93.12; 455/414.1; 705/14.1; 705/14.4; 705/26.1; 709/201

(58) Field of Classification Search .......... 370/259–271, 370/351–356; 379/114.1–114.13, 67.1–88.28, 379/91.01–93.13, 101.01, 201.01, 265.01–266.1; 455/426.1, 426.2, 445, 461, 462, 550.1–560, 455/412.1–420; 709/201–207, 217–248; 348/14.01–14.16; 704/270–278
See application file for complete search history.

(56) References Cited

U.S. PATENT DOCUMENTS

| | | | |
|---|---|---|---|
| 5,493,606 A * | 2/1996 | Osder et al. ............... | 379/88.05 |
| 5,625,683 A | 4/1997 | Nazanin et al. | |
| 5,636,346 A * | 6/1997 | Saxe ............... | 705/1.1 |
| 5,708,478 A | 1/1998 | Tognazzini | |
| 5,771,276 A * | 6/1998 | Wolf ............... | 379/88.16 |
| 5,991,737 A | 11/1999 | Chen | |
| 6,084,628 A * | 7/2000 | Sawyer ............... | 725/34 |
| 6,243,375 B1 * | 6/2001 | Speicher ............... | 370/352 |
| 6,351,640 B1 | 2/2002 | DeMont | |
| 6,501,832 B1 * | 12/2002 | Saylor et al. ............... | 379/88.04 |
| 6,751,299 B1 * | 6/2004 | Brown et al. ............... | 379/88.18 |
| 6,850,901 B1 * | 2/2005 | Hunter et al. ............... | 705/26.35 |
| 6,993,284 B2 | 1/2006 | Weinblatt et al. | |
| 7,035,388 B2 * | 4/2006 | Kurosaki ............... | 379/142.06 |
| 7,035,620 B2 | 4/2006 | Ben-Efraim et al. | |
| 7,058,356 B2 | 6/2006 | Slotznick | |
| 7,092,671 B2 | 8/2006 | Lunsford et al. | |
| 7,143,039 B1 * | 11/2006 | Stifelman et al. ............... | 704/270 |
| 7,155,213 B1 | 12/2006 | Almeda et al. | |
| 7,158,753 B2 | 1/2007 | Kagan et al. | |
| 7,792,257 B1 * | 9/2010 | Vanier et al. ............... | 379/114.13 |
| 2001/0014868 A1 * | 8/2001 | Herz et al. ............... | 705/14 |
| 2002/0035474 A1 * | 3/2002 | Alpdemir ............... | 704/270 |
| 2002/0055906 A1 * | 5/2002 | Katz et al. ............... | 705/39 |
| 2003/0046151 A1 * | 3/2003 | Abuan et al. ............... | 705/14 |
| 2004/0091093 A1 * | 5/2004 | Bookstaff ............... | 379/201.01 |
| 2005/0047571 A1 * | 3/2005 | Crandell et al. ............... | 379/201.03 |
| 2005/0131762 A1 * | 6/2005 | Bharat et al. ............... | 705/14 |

(Continued)

*Primary Examiner* — Hemant Patel
(74) *Attorney, Agent, or Firm* — Kelley Drye & Warren LLP

(57) ABSTRACT

Methods and systems for providing a telephone user with one or more of a plurality of possible voice scripts are disclosed. The voice scripts may be comprised of one or more individual voice modules which are dynamically selected for presentation to the user based on information known about the user. The information known about the user may include the user's identity, information obtained from the user on one or more previous calls, and/or demographic information obtained from third party sources. The user's identity may include the user's ANI, gender, and/or other identity data. The user's gender may be determined by analyzing the tonality of the user's voice.

23 Claims, 3 Drawing Sheets

U.S. PATENT DOCUMENTS

| | | | |
|---|---|---|---|
| 2005/0234779 A1* | 10/2005 | Chiu et al. | 705/24 |
| 2006/0049934 A1 | 3/2006 | Breen | |
| 2006/0093097 A1* | 5/2006 | Chang | 379/88.01 |
| 2007/0116227 A1* | 5/2007 | Vitenson et al. | 379/207.02 |
| 2007/0121846 A1* | 5/2007 | Altberg et al. | 379/114.13 |
| 2007/0140461 A1* | 6/2007 | Haldeman et al. | 379/218.01 |
| 2007/0274484 A1* | 11/2007 | Frank et al. | 379/114.13 |
| 2008/0008295 A1* | 1/2008 | Sivakumar | 379/67.1 |
| 2008/0065395 A1* | 3/2008 | Ferguson | 705/1 |
| 2010/0115060 A1* | 5/2010 | Julia et al. | 709/219 |
| 2011/0044437 A1* | 2/2011 | DeGolia | 379/88.22 |
| 2011/0066730 A1* | 3/2011 | Julia et al. | 709/226 |

* cited by examiner

| | | |
|---|---|---|
| STREET | HOME-OWNER | MAGAZINE-PHOTO |
| APT | LENGTH-RES | MAGAZINE-OPPORTUNITY |
| CITY | YEAR-BUILD | GARDNER |
| STATE | HOME-PURCHASE-PRICE | AUTO-BUFF |
| ZIP | HOME-PURCHASE-DATE | COOKNG |
| ZIP-PLUS-4 | HOUSE-SALE-AMOUNT | DECORATING |
| DELIVERY-POINT | EST-CUR-HOM-VAL | DOGS |
| CARRIER-ROUTE | HOME-HEAT-INDICATOR | CATS |
| STATE-CODE | POOL-INDICATOR | PET |
| COUNTY-CODE | FIREPLACE | TRAVELER |
| LATITUDE-9 | AIR-CONDITIONING | EXERCISE |
| LONGITUDE-9 | HOME-BUSINESS | OUTDOOR |
| TIME-ZONE | CREDIT-CARD | OUTDOOR-SPORT |
| PRESENCE-OF-CHILDREN | CREDIT-GOLD-CARD | CONTRIBUTOR-RELIGIOUS |
| NUMBER-OF-PERSONS-IN-UNI | CREDIT-RATING | CONTRIBUTOR-POLITICAL |
| PHONE | PC-OWNER | CONTRIBUTOR-HEALTH |
| DO-NOT-CALL | CHILD AGE-0-3 | CONTRIBUTOR-GENERAL |
| NAME-TYPE | CHILD AGE-4-6 | CONTRIBUTOR-ENVIRONMENT |
| FIRST-NAME | CHILD AGE 7-9 | CONTRIBUTOR-CHARITIES |
| MID-NAME | CHILD AGE-10-12 | INVESTMENT |
| LAST-NAME | CHILD AGE-13-18 | MORTGAGE-LENDER |
| TITLE | BOOK-READER | MORTGAGE-AMOUNT |
| SEX | MAIL-RESPONDER | MORTGAGE-RATE |
| DOB (YYYYMMDD) | MERCHANDISE-UPSCALE | MORTGAGE-RATE-TYPE |
| EXACT-AGE | MERCHANDISE-MALE | MORTGAGE-TERM-IN-MONTHS |
| AGE-IND | MERCHANDISE-FEMALE | MORTGAGE-LOAN-TYPE |
| HARD-AGE-IND | MERCHANDISE-CRAFT | MORTGAGE-TRANSACTION |
| PREFIX | MERCHANDISE-GARDENING | HOME-PURCHASE-TYPE |
| EDUCATION | MERCHANDISE-BOOK | REFINANCE-DATE |
| MARITAL-STATUS | MERCHANDISE-FOOD | REFINANCE-AMOUNT |
| OCCUPATION | MERCHANDISE-GIFT | REFINANCE-LENDER |
| BUSINESS-OWNER | MERCHANDISE-GENERAL | REFINANCE-RATE-TYPE |
| LANGUAGE | MAGAZINE-FAMILY | REFINANCE-TERM-IN-MONTH |
| ETHNIC | MAGAZINE-FEMALE | REFINANCE-LOAN-TYPE |
| ETHNIC-CONFIDENCE | MAGAZINE-MALE | HOUSEHOLD-NUMBER |
| CENSUS-TRACT | MAGAZINE-RELIGIOUS | HOUSEHOLD ID# |
| CENSUS-BLOCK | MAGAZINE-GARDENING | RELIGION CODE |
| SFDU-MFDU | MAGAZINE-CULINARY | MINORITY CODE |
| ISPSA | MAGAZINE-HEALTH | FULL NAME |
| INCOME | MAGAZINE-DO-IT-YOUR-SEL | |
| WEALTH-RATING | MAGAZINE-FINANCIAL | |

Fig. 3

INTUITIVE PROFILING ENGINE FOR VOICE-BASED TELEPHONY APPLICATIONS

CROSS-REFERENCE TO RELATED PATENT APPLICATIONS

The present application relates to, and claims priority on U.S. provisional patent application No. 60/841,541, filed Sep. 1, 2006, entitled "Intuitive Profiling Engine for Voice-Based Telephony Applications."

FIELD OF THE INVENTION

The present invention relates to methods and systems for providing predetermined voice scripts to a telephone caller based on caller profile information. More specifically, the methods and systems may present the telephone caller with a hierarchical series of voice prompts for responses from the caller which are selected based on the caller profile information and the caller responses.

BACKGROUND OF THE INVENTION

Currently, telephones are widely used for the purchase of goods and services. For example, it is common place for callers to purchase airline tickets, hotel accommodations, clothing, and house wares using the telephone. In fact, there are a multitude of television programs, and even entire television channels, dedicated to the advertisement of goods and services for purchase by telephone. It is also common place for callers to interact with local, state, and federal governmental bodies, as well as private companies to provide and obtain needed information using the telephone.

The ease with which a caller is able to consummate a purchase using a telephone is largely a function of the ability of the seller to provide a level of customer service that is adequate to answer the caller's purchasing questions, as well as take in the information required to complete the sale. While the personalized service of a live sales representative is adequate to fill these needs, it is expensive and limits the number of callers that may interact with the seller to the number of sales representatives that the seller employs. Accordingly, there is a need for automated methods of interacting with callers to consummate sales, as well as to provide needed interaction with governmental and private entities.

The ability of pleasing a caller using an automated call service is largely dependent on the ability of the automated service to provide interaction that is tailored as closely as possible to the caller's needs and interests. The art of tailoring automated sales services to the needs and interests of purchasers has been well developed in the computer arts where customer profiles are built from the customer's Internet activity. These profiles may then be used to send purchase opportunities to the purchaser which are targeted on the purchaser's interests.

The use of purchaser profile information has been less developed in the telephony arts, however it has begun to be used there. For example, Clifton et al., U.S. Pat. No. 6,983,044 (Jan. 6, 2006), which is hereby incorporated by reference, discloses a method that identifies known callers and uses call history information for the caller to provide the caller with an opportunity to reorder what she previously ordered. The '044 patent, however, is limited in that it only tailors the interaction with the caller to a small degree, and only based on information obtained from the caller's previous interaction with the specific telephone service with which the caller is connected.

In view of the foregoing, there is a need for an automated telephone service which is capable of tailoring interaction with a caller based not only on information obtained during a previous call, but also from third party sources. Further, there is a need for an automated telephone service which is capable of tailoring interaction with a caller based on a wide variety of information, and not just limited to prior purchase decisions. It is therefore an advantage of some, but not necessarily all, embodiments of the present invention to provide the foregoing capabilities.

There is also a need for an automated telephone service which is capable of tailoring interaction with a caller based on the caller's participation in multiple telephone calls with the service. The tailored interaction resulting from repeat telephone calls with the caller may include offering incentives, such as discounts, in return for the caller's willingness to participate in more than one call, and/or make a purchases after more than one call. It is therefore an advantage of some, but not necessarily all, embodiments of the present invention to provide systems and methods which offer such incentives and discounts.

Additional advantages of various embodiments of the invention are set forth, in part, in the description that follows and, in part, will be apparent to one of ordinary skill in the art from the description and/or from the practice of the invention.

SUMMARY OF THE INVENTION

Responsive to the foregoing challenges, Applicants have developed an innovative method of providing a telephone user with one of a plurality of possible voice scripts comprising the steps of: providing a telephonic connection between a telephone user and a telephonic service application; determining a user identity; determining previous call data related to the user; determining demographic data related to the user; and providing the user with one of the plurality of possible voice scripts wherein the one voice script is selected on the basis of user identity, previous call data and demographic data.

Applicants have further developed an innovative method of providing a telephone user with one of a plurality of possible voice scripts comprised of one or more voice modules, said method comprising the steps of: providing a telephonic connection between a telephone user and a telephonic service application; determining a user identity; determining previous call data collected by said service application related to the user; determining demographic data related to the user; providing the user with a first voice module prompt for a user response, wherein selection of the first voice module prompt is based on the determined previous call data and demographic data; receiving a response to the first voice module prompt; and providing the user with a second voice module prompt for a user response, wherein selection of the second voice module prompt is based on the previous call data, demographic data, and the response to the first voice module prompt.

Applicants have still further developed an innovative method of providing a telephone user with one of a plurality of possible voice scripts comprising the steps of: providing a telephonic connection between a telephone user and a telephonic service application; establishing a user identity; storing call data collected by said service application from the user; terminating the telephonic connection between the telephone user and the telephonic service application; providing a subsequent telephonic connection between the telephone user and the telephonic service application; determining the user identity; determining demographic data related to the user; and providing the user with one of the plurality of possible voice scripts based on the stored call data and stored demographic data for the user.

Applicants have still further developed an innovative method of providing a telephone user with a voice script comprised of dynamically selected voice modules, said method comprising the steps of: providing a telephonic connection between a telephone user and a telephonic service application; determining a user identity; determining electronically stored information about the user based on the user identity; and providing the user with a voice script comprised of voice modules wherein the voice modules comprising the script are selected based on the determined information about the user.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements.

FIG. 3 is an exemplary list of demographic data which may be collected regarding a caller.

DETAILED DESCRIPTION OF EMBODIMENTS OF THE INVENTION

Figure 1:
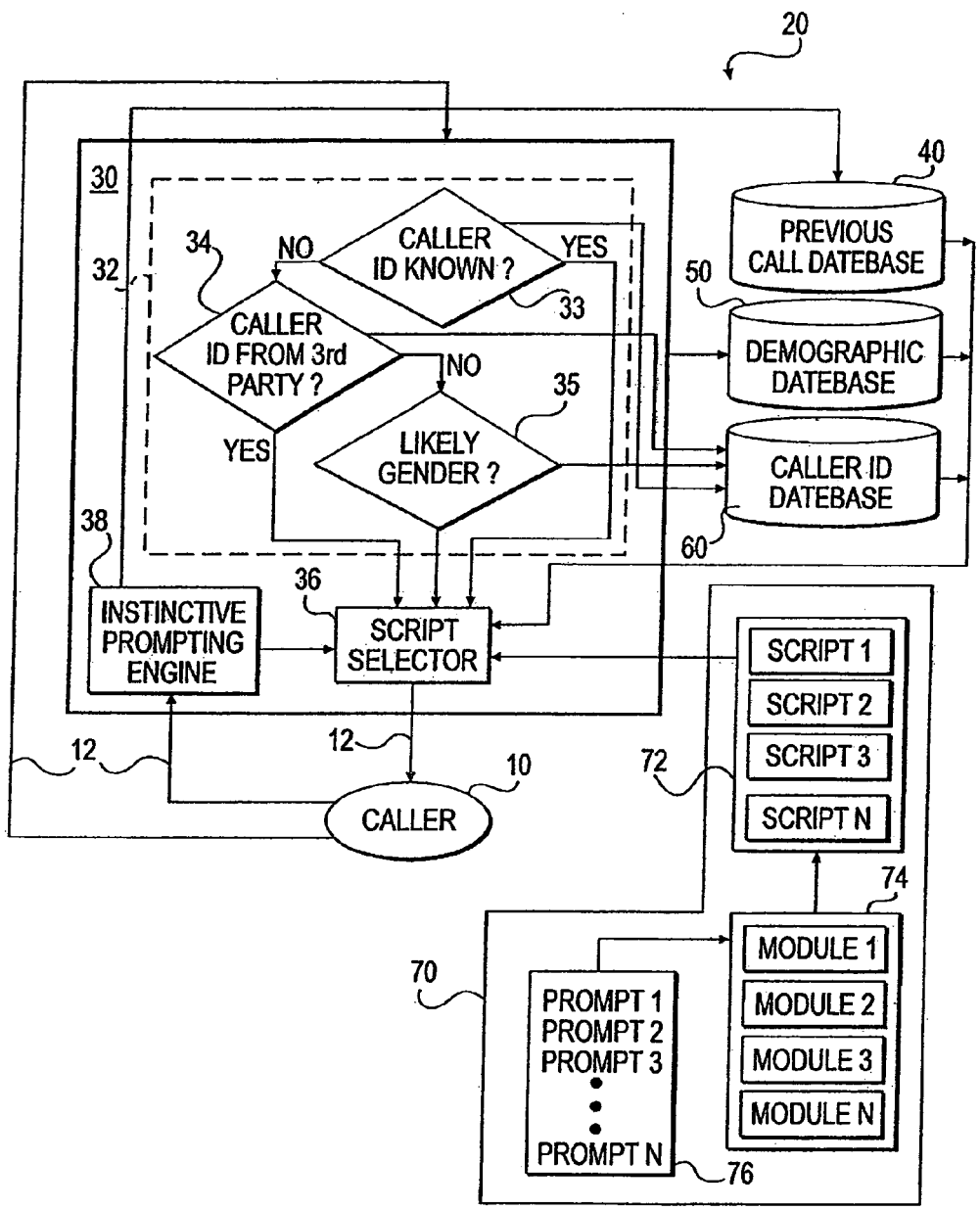
FIG. 1 is a schematic diagram of a system configured in accordance with a first embodiment of the present invention.

Reference will now be made in detail to a first embodiment of the present invention, an example of which is illustrated in the accompanying drawings. With reference to FIG. 1, a call connection 12 may be provided between a caller 10 and a voice-based telecommunications application 20. The call connection 12 may be provided through any hard wired or wireless telecommunications link capable of transmitting voice-based information. The application 20 may be adapted to provide voice-based services to the caller 10, which may include for example, but not be limited to, automated sales services. More specifically, the application 20 may dynamically tailor the voice-based information, including prompts for responsive information presented to the caller 10, based on information known about the caller, i.e., profile information. The application 20 may incorporate an intuitive profiling engine 30 which may retrieve information related to the caller from a previous call memory or database 40, a demographic memory or database 50, and/or a caller identification memory or database 60 to dynamically select scripts from a script memory 70 for presentation to the caller based on the information known about the caller.

The previous call database 40 may contain data related to a specific caller's previous interaction with the application 20. More specifically, the previous call database 40 may store information that a caller communicated to the application 20 during a previous call and/or at an earlier time during an ongoing call in response to prompts issued by the application. The type and form of information that may be stored by the previous call database 40 may vary widely. Examples of such information, which are not intended to limit the scope of the invention, include: purchase data, address data, name data, credit card data, debit card data, product interest data, uncompleted purchase data, number of calls with uncompleted purchase, call time data, call duration data, service interest data, product specification data and shipping method data. Address data may include shipping address data, billing address data, and home address data. Name data may include shipping name data, caller name data, billing name data and related name data (e.g., spouse's name, child's name, parents name). Purchase data may include, without limitation, particulars such as size, color, cost, number, accessories, packaging/gift wrapping, inclusion of a card or message, warranty selection, shipping method, purchase date, purchase time, and identity of the recipient.

The demographic database 50 may store demographic data related to a specific caller which is obtained from the caller and/or from one or more third party sources. The type and form of information that may be stored by the demographic database 50 may include information such as third party purchase data, third party product interest data, third party service interest data, home value data, income data, family size data, gender data, age data, marital status data, geographic location data, and credit history data. Geographic location data may further include country, state, province, county, address, and zip code data. The amount and type of demographic data that may be stored includes virtually all data related to a caller that does not fall into the category of previous call data and the foregoing list is intended to be exemplary only. An exemplary list of demographic data which may be collected is provided in FIG. 3.

The intuitive profiling engine 30 may be operatively connected to the previous call database 40 and the demographic database 50, and may comprise programming adapted to select one or more predetermined voice-based scripts for presentation to the caller 10 based on the information known about the caller. The intuitive profiling engine 30 may include a caller identification routine 32, a script selector 36, and an instinctive prompting engine 38.

The caller identification routine 32 may determine whether or not the identity of the caller is known in step 33. Caller identity may be determined in step 33 in any of a number of ways, but is preferably determined using the caller's Automatic Number Identification (ANI). Specifically, the caller's ANI may be compared with ANI's stored in the caller identification database 60 to determine if the caller has called the application 20 previously. Furthermore, any type and/or combinations of identification data may be used to establish caller identity, such as, but not limited to, ANI, telephone number, name, SSN, etc. Determination of caller identity in step 33 may involve the application prompting the caller to confirm one or more identification data items, such as for example, the caller's name.

If the caller's identity is not determined in step 33, the caller identification routine 32 may advance to step 34 to determine the caller identity from a third party source, i.e., a source outside of the application 20. Examples of third party sources include, but are not limited to, Internet sources and other call service applications. Caller identity may be determined in step 34 in any number of alternative ways, but again, is preferably determined using the caller's ANI. As in step 33, one or more combinations of identification data may be used to establish caller identity, and the application may request that the caller confirm one or more of these identification data items.

If the caller's identity is not determined in step 34, the caller identification routine 32 may advance to step 35 to determine the likely gender of the caller. The likely gender of the caller may be determined using known methods of analyzing the caller's voice tone to determine if it is more likely that the caller is a male or a female caller. For example, Bossemeyer, Jr. et al., U.S. Pat. No. 6,076,055 (Jun. 13, 2000) and Chang et al., U.S. Pat. No. 6,567,776 (May 20, 2003), which are incorporated herein by reference, disclose methods which may be use to determine the likely gender of a speaker based on the speaker's voice tone. The likely gender determination in step 35 may provide a less preferred surrogate for true caller identity when steps 33 and 34 fail to make that determination.

The identification data that is determined in steps 33, 34 and/or 35 of the caller identification routine 32 may be stored in the caller identification database 60. Examples of the identification data stored in the caller identification database 60 may include ANI, telephone number, billing number, name, gender, etc.

The intuitive profiling engine 30 may further include a script selector algorithm 36. The script selector 36 may be provided with the caller identity established by the caller identification routine 32. If the caller identity has been determined, the script selector 36 may retrieve data related to the determined caller identity which is stored in the previous call database 40 and the demographic database 50. The script selector 36 may then select a predetermined script from script memory 70 based on the information related to the caller that is available to the script selector from the previous call database 40, the demographic database 50 and/or the caller identification database 60. The intuitive profiling engine 30 may also query third party sources for demographic information related to the caller if no demographic data for the caller is stored in the demographic database 50 or if an update of stored demographic data is desired. If no information about the caller is known, the script selector 36 may select a script specially tailored to new callers.

Each of the plurality of available scripts 72 in the script memory 70 may be comprised of one or more voice modules 74. Some voice modules may be used in multiple scripts, while others may be used with only one script. In turn, the modules 74 may include one or more voice prompts 76 which include a query for the caller to respond to. For example, the script selector 36 may determine that the caller should be presented with script 2 based on the caller's identity, previous call data and demographic data. Script 2 may be predetermined to be comprised of modules 1, 4 and 3, in that order. Further, module 1 may be a credit card module which is comprised of a number of voice prompts required to collect the caller's credit card information that is to be used for a purchase. Prompt 1 of module 1 may comprise a query such as: "Please state what type of credit card you have, Master Card, Visa, Discover, or other." After a response is received from the caller to Prompt 1, Prompt 2 of module 1 may comprise the query, "Thank you for indicating that you have a Visa credit card, if this is correct, please state your credit card number, or use the touch tone buttons on your telephone to indicate the credit card number." The sequence of caller responses and prompts 76 may continue until all prompts in the credit card module are answered. At that point the next module in the selected script, which in the example above would be module 4, would be presented to the caller by providing prompt 1 of module 4 to the caller. This process would continue until all prompts of all modules in the selected script are answered, or until the selected script is replaced by a new script or the call is terminated. Subsequent scripts may also be presented to the caller based on the previous call data, demographic data and caller identification. Any number of scripts, modules and prompts may be provided by the system.

Each response provided by the caller 10 to the prompts 76 may be provided to the instinctive prompting engine 38 in the intuitive profiling engine 30. The instinctive prompting engine 38 may provide the caller response to the script selector 36 and to the previous call database 40 for storage. The script selector 36 may revise the selection of script(s) for the caller at any time during the call based on the caller responses made during the call with or without regard to the previous call data, demographic data and caller identification data.

Figure 2:
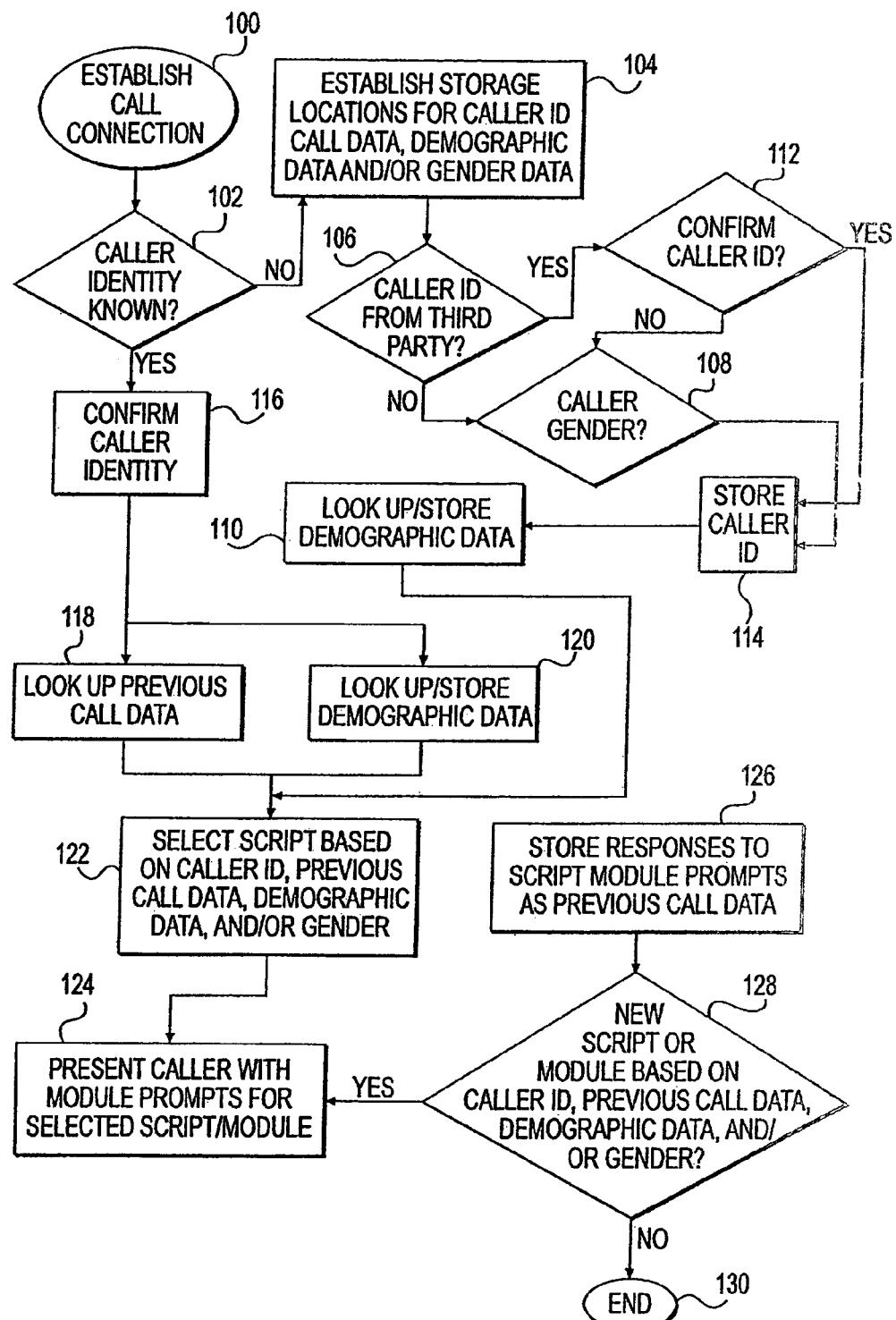
FIG. 2 is a flow diagram illustrating a first method embodiment of the present invention.

A first method embodiment of the present invention may now be described with reference to FIG. 2. In step 100 a call connection may be provided between a caller and a voice-based call application. Once the call connection is established, the application may attempt to determine the identity of the caller in step 102. The identity of the caller may be determined by any number of identification criterion, including without limitation ANI, telephone number and name.

If the identity of the caller cannot be determined from the call connection in step 102, the caller may be treated as a new caller and a memory storage location may be allocated for the caller's identity in step 104. Additionally, memory storage locations may be allocated at this time or a later time for storage of call data received from the caller during the call, demographic data obtained from third party sources relating to the caller, and/or data indicating the likely gender of the caller. The application may further attempt to determine the identity of the caller in step 106 using one or more third party sources. If the caller identity is determined using a third party source, such as an Internet source, the caller may be requested to confirm her identity in step 112, and if the identity is confirmed, the identity may be stored in a memory location in step 114. If the identity of the caller cannot be determined from a third party source in step 106, or if the identity of the caller is not confirmed in step 112, then the application may attempt to determine the likely gender of the caller in step 108. The likely gender of the caller may be determined to provide a crude form of caller identity. If the likely gender of the caller is determined it may be stored as a surrogate caller identity in step 114.

Returning to step 102, the identity of the caller may be affirmatively determined in step 102, in which case the caller may be requested to confirm one or more indicia of caller identity in step 116. The caller may confirm her identity through any available means over the telephonic connection, including without limitation through voice or touch tone communication.

Based on the caller identity established in steps 116 or 114, the application may query third party sources external to the application for demographic data and/or look up previously stored demographic data in a database in steps 110 and 120. Newly obtained demographic data also may be stored in the database for future use. In step 118 the application may look up data relating to information received from the caller during a previous call. Previous call data may include, among other data, whether or not the caller has terminated one or more previous calls without completing a transaction, such as a purchase.

In step 122 the application may select a script for presentation to the caller based on the caller identity, which may include likely gender, demographic data, and previous call data that may be available for the caller. The script may be made up of a number of voice modules, which in turn may include a number of prompts which solicit information from the caller. In step 124 the first voice module in the script selected for the caller is presented to the caller. Each of the responses to the prompts in the first module may be stored in a memory associated with the previous call database in step 126. After each prompt is responded to, or alternatively, after the completion of all prompts in the first module, the application may determine whether a new script or module should be presented to the caller based on the caller's responses and the caller identity, previous call data, and demographic data in step 128. After the determination of the need to provide the caller with a new module, and/or script the application may to step 124. When the application determines that no additional modules or scripts should be presented to the caller, the application may terminate in step 130.

The following is a non-limiting example of the use of caller identification, previous call data and demographic data to tailor the selection of voice scripts for a particular caller. After a call connection, which may originate from the caller or the system 20, is established, the system may determine that the caller has previously terminated a call without completing a transaction, such as a purchase. The system may also determine from known demographic data that the caller is a female. Based on the foregoing, the system may select a voice script for the caller that includes an purchaser discount or other incentive if they complete a transaction as a result of the current call. The particular discount script selected may depend on the number of calls that have taken place without completion of a transaction, the time elapsed between calls, or other factors. Alternative to, or in conjunction with, a discount script, the system may select one or more incentive scripts for presentation to the caller, such as offering free shipping, or free gifts contingent on completion of a transaction. Thus, the system may use a strategic discount to entice the caller to make a purchase. The amount of the discount may vary based on any number of factors, including how many times the caller has been called (or called) about an offering.

It will be apparent to those skilled in the art that variations and modifications of the present invention can be made without departing from the scope or spirit of the invention. For example, variations may be made in the manner of determining the identity of a caller without departing from the intended scope of the invention. Further, the number and arrangement of the databases used to store caller identity, previous call, and demographic data may be changed without departing from the intended scope of the invention. Still further, the types of third party sources for demographic data, and the categories of previous call data and demographic data are intended to be expansive and not limited to the particular examples listed herein.

What is claimed is:

1. A method of providing a telephone user with a predetermined voice script comprising the steps of:
   providing a telephonic connection between a telephone user and a telephonic service application;
   determining a user identity;
   determining previous call data related to the user;
   determining third party demographic data related to the user; and
   dynamically selecting a first one of a plurality of possible voice scripts for the user based on user identity, previous call data, and demographic data;
   providing the user with a prompt for information based on the selection of the first one of a plurality of possible voice scripts; and
   dynamically selecting a second one of the plurality of possible voice scripts for the user based on user identity, previous call data, demographic data, and a user response to the prompt for information before completion of the first one of the plurality of possible voice scripts,
   wherein each of the plurality of possible voice scripts comprises one or more voice modules.

2. The method of claim 1 wherein the user identity comprises an ANI.

3. The method of claim 1 wherein each of the plurality of possible voice scripts comprises two or more voice modules.

4. The method of claim 1 wherein each of the one or more voice modules includes one or more voice prompts which request information from the user.

5. The method of claim 1 wherein the user identity comprises the user's name.

6. The method of claim 1 wherein the step of determining a user identity includes the steps of:
   determining an expected user identity;
   communicating the expected user identity from the telephonic service application to the user; and
   receiving an indication of the correctness of the expected user identity at the telephonic service application.

7. The method of claim 6 wherein the expected user identity is determined from a third party source.

8. The method of claim 1 wherein the user identity comprises the likely gender of the user based on voice tone.

9. The method of claim 1 wherein the previous call data includes data selected from the group consisting of: purchase data, address data, name data, credit card data, debit card data, product interest data, uncompleted purchase data, call time data, call duration data, service interest data, and product specification data.

10. The method of claim 1 further comprising the steps of:
    receiving a response from the user to the one of the plurality of possible voice scripts; and
    storing the response as previous call data.

11. The method of claim 4 further comprising the steps of:
    receiving a response from the user to a voice prompt; and
    storing the response as previous call data.

12. The method of claim 1 wherein the demographic data includes data selected from the group consisting of: third party purchase data, third party product interest data, third party service interest data, home value data, income data, family size data, gender data, age data, marital status data, and credit history data.

13. The method of claim 9 wherein the demographic data includes data selected from the group consisting of: third party purchase data, third party product interest data, third party service interest data, home value data, income data, family size data, gender data, age data, marital status data, credit history data.

14. The method of claim 1 wherein the demographic data comprises age data, gender data, and marital status data.

15. The method of claim 14 wherein the demographic data further includes income data.

16. The method of claim 10 wherein the user response is vocal.

17. The method of claim 10 wherein the user response is by touch tone dial.

18. A method of providing a telephone user with one of a plurality of possible voice scripts comprised of one or more voice modules, said method comprising the steps of:
    providing a plurality of voice modules in a computer memory, each of said voice modules being associated with one or more of said plurality of possible voice scripts;
    providing a telephonic connection between a telephone user and a telephonic service application;
    determining a user identity;
    determining previous call data collected by said service application related to the user;
    determining third party demographic data related to the user;

dynamically selecting a first one of said plurality of possible voice scripts for presentation to the user based on the determined previous call data and demographic data;

providing the user with a first voice module prompt for a user response, wherein selection of the first voice module prompt is based on the association of a first voice module with the selected first one of said plurality of possible voice scripts;

receiving a response to the first voice module prompt;

dynamically selecting a second one of said plurality of possible voice scripts for presentation to the user based on the response to the first voice module prompt, determined previous call data and demographic data; and providing the user with a second voice module prompt for a user response before completion of the selected first one of said plurality of possible voice scripts, wherein selection of the second voice module prompt is based on the association of a second voice module with the selected second one of said plurality of possible voice scripts.

19. A method of providing a telephone user with one of a plurality of possible voice scripts comprising the steps of:

providing a plurality of voice modules in a computer memory, each of said voice modules being associated with one or more of said plurality of possible voice scripts;

providing a telephonic connection between a telephone user and a telephonic service application;

establishing a user identity;

storing call data collected by said service application from the user;

terminating the telephonic connection between the telephone user and the telephonic service application;

providing a subsequent telephonic connection between the telephone user and the telephonic service application;

determining the user identity;

determining third party demographic data related to the user;

dynamically selecting one of said plurality of possible voice scripts for the user based on the stored call data and the demographic data for the user;

determining which voice modules and voice prompts are associated with the selected one of said plurality of possible voice scripts; and providing the user with less than all of the voice modules and voice prompts determined to be associated with the selected one of said plurality of possible voice scripts;

receiving a response to a voice prompt from the user;

dynamically selecting a second one of said plurality of possible voice scripts for the user based on the response to the voice prompt received from the user, the stored call data, and the demographic data for the user;

determining which voice modules and voice prompts are associated with the selected second one of said plurality of possible voice scripts; and providing the user with voice modules and voice prompts associated with selected second one of said plurality of possible voice scripts before completion of the selected one of said plurality of possible voice scripts.

20. The method of claim 19 further comprising the step of: determining the likely gender of the user by voice tone, and wherein the step of providing the user with one of a plurality of possible voice scripts is further based on the likely gender of the user.

21. The method of claim 19 further comprising the step of storing the demographic data related to the user.

22. The method of claim 19 wherein at least one of the voice modules comprising the script includes an offer of an incentive for a purchase.

23. The method of claim 19 wherein at least one of the voice modules comprising the script includes an offer of a discount for a purchase.

* * * * *